INVENTOR.
Richard Theurer
BY
Arthur A. March
ATTORNEY

United States Patent Office 3,425,331
Patented Feb. 4, 1969

3,425,331
PHOTOGRAPHIC SHUTTER WITH SWINGING-THROUGH BLADES
Richard Theurer, Hofen, Black Forest, Germany, assignor to Prontor-Werk Alfred Gauthier, G.m.b.H., Calmbach, Black Forest, Germany, a corporation of Germany
Filed Dec. 22, 1965, Ser. No. 515,527
Claims priority, application Germany, Dec. 28, 1964, G 42,396
U.S. Cl. 95—61   8 Claims
Int. Cl. G03b 9/00, 9/20

ABSTRACT OF THE DISCLOSURE

A photographic camera with swinging-through blades that has a blade operating ring and a driving device coupled to the blade operating ring. There is also provided a load transmission member alternately reciprocating the driving device first in one direction of rotation and then in the opposite direction of rotation. Two control pawls are provided which are similarly shaped and shear-like in design, these pawls being associated with the load transmission member. A spring is positioned to spread the pawls apart and two stops are situated on the driving device and cooperate alternately with the pawls during the cocking process, thereby causing one of the two driving edges situated on the load transmission member to engage one of the respective stops.

---

The present invention relates to a photographic shutter with swinging-through blades, which is equipped with a driving device in the form of a reversing lever connected to the blade operating ring, as well as a load transmission member which alternately reciprocates the reversing lever in opposite directions of rotation.

Known to the art is a shutter arrangement of the preceding species, which is provided with a double pawl designed for drawing action, and which co-operates with a shift and transmission lever so that the lever is first moved to the left and then to the right. The shift and transmission lever is, in turn, engaged by the blade operating ring acting on the swinging through blades. This known arrangement requires improvement because the mechanism designed for reversing the motion, requires a comparatively large amount of structural complexity, and this causes the reversing mechanism to be costly and unreliable.

It is therefore, an object of the present invention to avoid the disadvantages of the known shutter arrangement with a reciprocally driven blade operating ring, by providing a swinging-through shutter which assures dependable operation with a minimum number of structural members.

The present invention solves this problem by providing the load transmission member designed in the form of a connecting rod, with two similarly shaped, shear-like control pawls. These pawls are maintained in spread position by a spring, and they alternately co-operate, during the cocking process, with two stops situated on the reversing lever. The pawls thereby cause one of two driving edges provided on the connecting rod, to engage one of the respective stops. In this manner, the invention provides a swinging-through shutter which assures maximum dependability, while requiring a minimum number of structural elements. Those structural elements which are used, on the other hand, are simple and readily manufactured.

An advantageous extension of the arrangement disclosed by the invention, provides that each control pawl be provided with a control edge situated slantingly and symmetrically with respect to the longitudinal axis of the connecting rod. This produces the conditions for obtaining a dependable positive guide. It also results in consistent action of the connecting rod against the reversing lever co-operably connected to the blade operating ring. A particularly favorable embodiment of the invention can be further obtained through a stop provided on the connecting rod, for the purpose of limiting the spreading of the control pawl.

Other advantages and objects of the present invention appear in the following description and specification accompanied by drawings in which—

Figure 1:
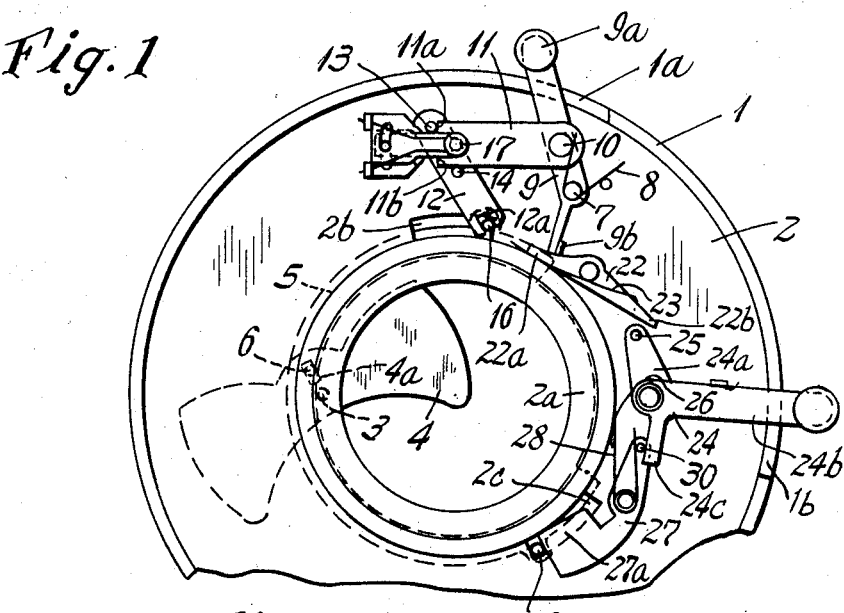
FIG. 1 shows the cocking shutter with the cover plate removed, when in the non-operating position and the blade operating ring in an end position.

In accordance with the drawing, the housing of a photographic cocking shutter is denoted by 1, a base plate fixed to the housing is designated by 2, and 2a is a tubular socket located on the base plate. Several as, for example, five, two-winged swinging-through blades 4 may be positioned on fixed pins or pivots 3 between the base plate 2 and the bottom of the shutter housing 1. For purposes of clarity, however, only one such blade 4 is illustrated in the drawing. A blade operating ring 5 guided on the tubular opening or socket 2a, functions in the motion of the swinging-through blade 4. This is derived from the condition that pins 6 of ring 5 are engaged with corresponding slots 4a of the swinging-through blades. Upon being rotated, the blade operating ring 5 causes displacement of the swinging-through blades 4. In the course of executing an exposure the displacement occurs from the position shown in FIG. 1, to the closing position now occupied by those wings of the swinging-through blades, which are located outside the shutter opening, or vice versa.

The invention further provides a driving lever 9 positioned on a fixed pin or pivot 7, and acted upon by a driving spring 8, for the purpose of driving the blade operating ring 5. In the present embodiment, the driving lever 9 for cocking the driving spring 8, is guided out of the shutter housing 1 by a slot 1a, and is provided with a finger-element 9a. The edges of the slot 1a serve well as stops for the driving lever 9 when in the starting position shown in FIG. 1, or when the driving lever is moved into the cocking position. A connecting rod 11 is coupled to the driving lever 9 by means of a pin 10 which simultaneously supports an arm of the driving spring 8.

Figure 3:
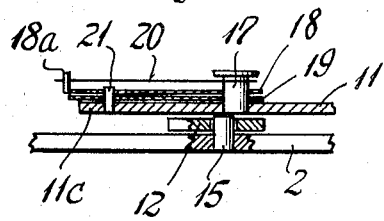
FIG. 3 is a cross-section taken along the line III—III in FIG. 2.

The connecting rod 11 can be caused to engage alternately reversing lever 12 co-operably connected to the blade operating ring 5. For this purpose, the connecting rod 11 comprises two driving edges 11a and 11b extending transversely to their direction of motion. These edges, can be caused to engage alternately two stops in the form of, for example, driving pins 13 and 14 fixed on the reversing lever 12, when the driving lever 9 is moved into the cocked position. As especially apparent from FIG. 3, the reversing lever 12 is again positioned on a pin or pivot 15 firmly mounted to the base-plate 2. The lever has, at its end associated with blade operating ring 5, a recess 12a engaged by a driving pin 16 of the blade operating ring. The driving pin is guided outward through a slot 2b of the baseplate.

Figure 2:
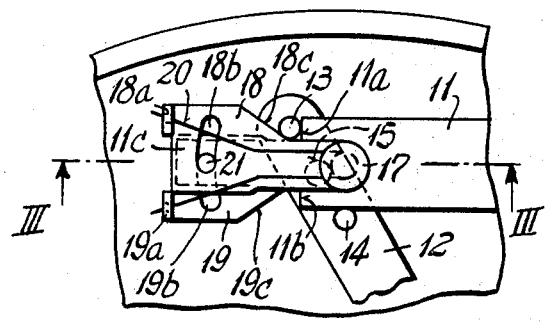
FIG. 2 shows on an enlarged scale, the connecting rod in FIGURE 1, with the control pawls.

In order to enable the correct driving edge (11a or 11b) of connecting rod 11 to engage reversing lever 12 during the cocking process, according to the respective starting positions of the reversing lever, two similarly shaped control pawls 18 and 19 are provided. The pawls are situated shearlike, on the connecting rod through means of bearing pin 17, and are kept spread apart by a coil spring 20 positioned on pin 17 and acting on the bent-up lugs 18a and 19a. In order to limit the spreading motion of control pawls 18 and 19 in the starting position, a stop pin 21 fixed to a symmetrical extension 11c of connecting rod 11 is provided. As especially apparent from FIG. 2, stop pin 21 engages slot 18b or 19b of the control pawls. Moreover, each control pawl 18 or 19 is provided with a control edge 18c or 19c inclined with respect to the longitudinal axis of the connecting rod 11. Corresponding to the respective starting position of the reversing lever 12, the control edges co-operate alternately with driving pins 13 and 14 when the connecting rod 11 is moved into the cocking position.

In order to maintain driving lever 9 in cocked position, the lever may be associated with a two-armed arresting lever 22, one arm 22a of which, is moved in front of a lug 9b bent up from driving lever 9. This placement of arm 22a is due to the action of a spring 23, in the final phase of the cocking motion of the driving lever. In order to cancel the arresting action of lever 22, the latter cooperates with a firmly mounted three-armed release lever 24 whose arm 24a carries a pin 25. Upon the release lever being actuated, pin 25 impinges on arm 22b of the arresting lever, and thereby pivots the lever out of its arresting or locking position.

To allow for manual operation, the arm 24b of release lever 24 is guided out of the shutter housing 1 through a slot 1b. In the starting position shown in FIG. 1, the arm engages the edge of the slot due to the action of a restoring spring 26. The release lever 24 co-operates, by means of arm 24c, with a second arresting lever 27. The latter is provided for the purpose of arresting the blade operating ring 5 in the position which corresponds to the closing position of the swinging-through blades 4, during the cocking process. In accordance with this purpose, the arresting lever 27 includes, at one end, a lug 27a which is moved due to the action of a coil spring 28, into the path of motion of a pin 29. This pin is fixed to the blade operating ring 5 and is guided through a slot 2c in the base plate 2. The blade operating ring is thereby blocked in its respective end position. At its other end, lever 27 carries a pin 30 associated with arm 24c of release lever 24 so that, upon actuation of arm 24b, the arresting lever 27 is pivoted against the action of spring 28. The lug 27a is thereby moved out of the path of pin 29.

Figure 4:
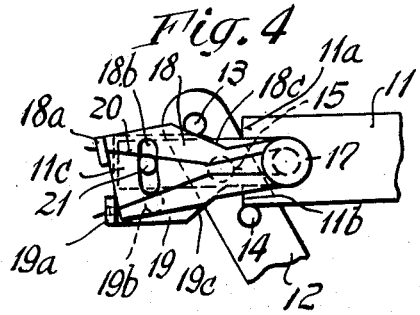
FIG. 4 shows the control pawls and the connecting rod with respect to the driving pins, in an intermediate position during the cocking process.

The shutter arrangement as described above, operates in the following manner:

For the purpose of cocking the driving spring 8, the driving lever 9 is rotated clockwise about the pin or pivot 7, from the starting position shown in FIG. 1. In this starting position, the blade operating ring 5 and reversing lever 12 occupy one of the end positions. During the rotary motion, the connecting rod 11 with the control pawls 18 and 19, is moved to the right with respect to FIG. 1. During this motion, control edge 18c of control pawl 18 rides up the driving pin 13 as shown in FIG. 4. The pawl is thereby pivoted about bearing pin 17 in counterclockwise direction, while the tension of the coil spring 20 is being increased. At the same time, the driving edge 11b of connecting rod 11 arrives within the region of the driving pin 14.

Figure 5:
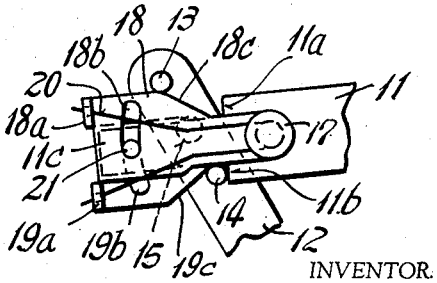
FIG. 5 shows the connecting rod with control pawls, after it has been transferred from the end position illustrated in FIG. 1, into the cocked position.

As the cocking motion progresses, connecting rod 11 loses its support on driving pin 14, so that the connecting rod is rotated counterclockwise about pin 10 on driving lever 9. This results from the action of spring 20 and edge 11b is thereby moved in front of the driving pin 14, as apparent from FIG. 5. Upon further motion of the driving lever 9, immediately thereafter, arm 22a of the arresting lever drops in front of the bent up lug 9b, and the driving lever is thereby arrested in the cocked position.

For purposes of releasing the shutter, the release lever is rotated clockwise by actuation of arm 24b. The two arresting levers 22 and 27 are thereby pivoted in counterclockwise direction, causing lug 27a to release pin 29 of the blade operating ring 5, and arm 22a to slide off lug 9b of driving lever 9. After the driving lever 9 has been released, it returns from the cocked position to the position illustrated in FIG. 1, as a result of driving spring 8. This motion causes, in turn, the result that the connecting rod 11, engaging driving pin 14 by means of its edge 11b, is pushed to the left with respect to FIG. 5. Reversing lever 12 and the blade operating ring 5 are thereby moved in clockwise and counterclockwise directions respectively, and into the other end position. This rotary motion of the blade operating ring has the effect that the blades 4 change from the end position shown in FIG. 1, to the other end position, thereby releasing the shutter opening. After the shutter has executed its function, pins 16 and 29 are at the other end of slots 2b and 2c respectively.

During the next cocking process, driving lever 9 is again rotated clockwise against the action of driving spring 8. Control edge 19c of pawl 19 thereby rides up pin 14, so that driving edge 11a engages pin 13 in the final phase of the cocking motion. After the shutter has been released by means of lever 24, the process described above proceeds in an analogous manner. Thus reversing lever 12 is moved in counterclockwise direction, and the blade operating ring 5 is moved in clockwise direction. In this way, the swinging-through blades 4 occupy again the end position shown in FIG. 1, after the exposure has been completed.

What is claimed is:

1. A photographic shutter with swinging-through blades including: a blade operating ring; a driving device coupled to said blade operating ring; a load transmission member alternately reciprocating said driving device first in one direction of rotation and then in the opposite direction of rotation; two control pawls similarly shaped, shear-like in design, and associated with said load transmission member; a spring to speread apart said pawls; and two stops situated on said driving device, said control pawls being pivotally mounted on said load transmission member and having control edges engageable alternately with said two stops on said driving device during the cocking process thereby causing one of two driving edges situated on said load transmission member to engage one of said stops respectively.

2. The photographic shutter with swinging-through blades of claim 1, wherein said driving device comprises a reversing lever.

3. The photographic shutter with swinging-through blades of claim 1, wherein said load transmission member is in form of a connecting rod.

4. The photographic shutter with swinging-through blades of claim 3, wherein each one of said control pawls includes a control edge, both of said control edges being slantingly and symmetrically arranged with respect to the longitudinal axis of said connecting rod.

5. The photographic shutter with swinging-through blades of claim 4, wherein a stop situated on said connecting rod limits the spreading apart of said control pawls.

6. The photographic shutter with swinging-through blades including: two control pawls similarly shaped and shear-like arranged; a connecting rod supporting said control pawls; a spring to maintain said pawls in a spread-apart position; two stops cooperating alternately with said pawls during the cocking process; a reversing lever carrying said two stops; one of said stops being respectively engaged by one of two driving edges on said connecting rod; and a blade operating ring coupled to said reversing rod lever, said reversing lever being alternately reciprocated by said connecting rod first in one direction of rotation and then in the opposite direction of rotation.

7. The photographic shutter with swinging-through blades including: a reversing lever; a blade operating ring connected to said reversing lever; a connecting rod reciprocating alternately said reversing member in opposite directions of rotation; a limit stop adapted to said connecting rod; two control pawls shear-like and similarly associated with said connecting rod; a spring for spreading apart said control pawls; said spreading of said pawls being confined by said limit stop; means in form of a control edge associated with each one of said control pawls, said control edges being slantingly and symmetrically situated with respect to the longitudinal axis of said connecting rod; and two stops attached to said reversing lever and cooperating alternately with said pawls during the cocking process; one of said stops being engaged respectively during the cocking process by one of two driving edges associated with said connecting rod.

8. The photographic shutter with swinging-through blades including: a connecting rod; a limit stop located on said connecting rod; a spring; two control pawls of similar shape and shear-like situated on said connecting rod, said pawls being held spread apart by said spring within confinement of said limit stop; a blade operating ring; a reversing member connected to said blade operating ring and being alternately reciprocated by said reversing member first in one direction of rotation and then in the opposite direction of rotation; two stops located on said reversing member, said pawls alternately cooperating with said stops during the cocking process and causing one of said stops to engage respectively one of two driving edges situated on said connecting rod; and means in form of a control edge associated with each one of said pawls, said means being slantingly and symmetrically arranged with respect to the longitudinal axis of said connecting rod.

References Cited

UNITED STATES PATENTS 2,728,282  12/1955  Weiss _____ 95—59 X

JOHN M. HORAN, *Primary Examiner.*